United States Patent Office 3,826,728
Patented July 30, 1974

3,826,728
TRANSPARENT ARTICLE HAVING REDUCED
SOLAR RADIATION TRANSMITTANCE AND
METHOD OF MAKING THE SAME
Douglas L. Chambers, Donald C. Carmichael, and Chong T. Wan, Columbus, Ohio, assignors to Shatterproof Glass Corporation, Detroit, Mich.
Continuation of abandoned application Ser. No. 38,962, May 20, 1970. This application May 15, 1972, Ser. No. 253,278
Int. Cl. C23c 15/00
U.S. Cl. 204—192
2 Claims

ABSTRACT OF THE DISCLOSURE

A transparent article having reduced solar radiation transmittance which comprises a body of transparent glassy siliceous material having a smooth continuous surface and a continuous film of nickel or nickel-base alloys sputter-coated on said continuous surface to a thickness of from 50 to 400 A. The article may include a continuous protective layer of a siliceous or aluminum oxide material overlying the continuous film. The sputter-coating technique permits the metal film to be deposited with greater uniformity and purity. The resulting article minimizes the transmittance of radiation in the infra-red range for any selected transmittance of visible light.

BACKGROUND OF THE INVENTION

Figure 1:
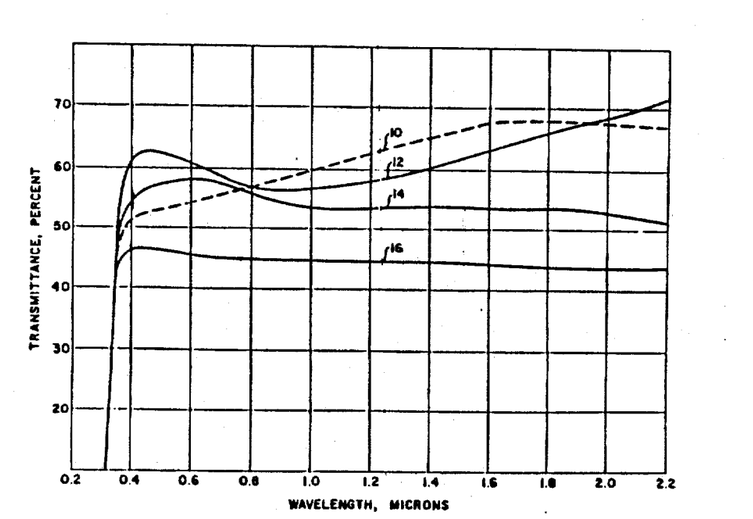

This application is a continuation of pending application Ser. No. 38,962, filed May 20, 1970 and now abandoned.

This invention relates to transparent articles having reduced solar radiation transmittance and reduced glare and to a method of producing such articles. It is particularly concerned with sputter-coating a continuous film of nickel or a nickel-base alloy on the smooth surface of a body of glassy siliceous material.

The architectural trend toward using more glass in commercial buildings has been enhanced by the availability of special coated and tinted glasses which not only serve an aesthetic purpose but also are functional. The most significant advantages are in the area of air conditioning. Since it generally costs from three to six times more to cool a building one degree than to heat it by the same amount (depending on the amount of glass used), the use of a glass which will reduce the amount of solar radiation entering a building can provide substantial savings. Generally, less air conditioning equipment is required and its operation is less costly.

Over the past decade the market for colored and reflective glass in commercial construction has grown significantly. The colored glass involved is basically of two types—tinted and coated. Tinted glass is generally made by adding selected metals such as iron, cobalt, and nickel to the molten glass during production. This method of producing colored glass is time-consuming and wasteful in that when a different color of glass is desired, a four- or five-day run of glass must be discarded while the change is made and the new batch stabilized. Also, large quantities of different colors and types of glass must be inventoried. In addition, although tinted glass does reduce glare, it also absorbs solar heat and the absorbed heat is re-radiated from both sides of the glass. Therefore, a greater amount of heat is allowed to enter the building than with coated glass.

Coated or reflective glass is provided with a thin film of a reflective substance on one of its surfaces. The thin film reflects the solar radiation much more effectively than tinted glass since the glass does not absorb the radiation. However, a durable coating which will not rub or wear off the glass sheet has not yet been perfected. Most companies only sell coated glass in double glazing (two panes separated by an air space) and laminated forms.

The most significant problem with coated glasses is that as the thickness of the coating is increased to further reduce heat transmittance, light transmittance is also reduced. The goal is to produce a coated glass that will minimize the transmittance of radiation in the infra-red range (greater than approximately 0.75 microns in wavelength) for any selected transmittance of visible light (nominally 0.4 to 0.75 microns in wavelength). In other words, it is the overall effectiveness of the coated glass in regard to the entire range of wavelengths which is important.

Present commercial coatings of chromium and nickel applied by techniques other than sputtering show increasing transmittance with increasing wavelength. We have found that by sputter-coating the glass with nickel or nickel-base alloys according to the present invention, the article exhibited lower transmittance in the infra-red range than in the visible light range and that the transmittance decreased with increasing wavelength. This is significant in that a transparent glass article can be produced to admit a predetermined amount of visible light (by varying the film thickness) and at the same time admit only a minimum amount of heat for that amount of light. Therefore, optimum performance is achieved.

We have found that the sputter-coating technique as applied in the present invention produces a product having superior optical properties and improved adhesion. In addition, sputtering also has the advantage over thermal evaporation techniques in that the source (the target or cathode) is not a point or line source but a surface source. This is a particularly important advantage in the present application involving coating of large-area substrates. If a target surface in sputtering is made to be parallel to the substrate surface over all areas of the substrate (like a flat target placed parallel to a flat substrate), the coating thickness will be extremely uniform. Any edge effect in the thickness uniformity can be minimized by making the target dimensions 2 to 4 inches larger than the substrate dimensions. The distance between the target and the substrate surfaces can thus be as close as 2 inches and a relatively small vacuum chamber is required. Sputtering is a somewhat slower process than the thermal vacuum-evaporation process, but for the thin optical coatings of interest this process results in superior control of coating thickness and the rate is satisfactory for commercial production. Because the source (coating) material forming the target will last for a long time, sputtering is quite adaptable to a semicontinuous or continuous manufacturing operation.

Sputtering has the following advantages over the vacuum evaporation techniques currently in use for production of coated window glass:

A smaller deposition chamber can be used. The vacuum evaporation technique uses one or more point sources which must scan the surface during deposition and with the larger substrates, the necessary spacing between the sources and the substrate correspondingly increases. This may require a spacing of several feet when coating large sheets of glass. The target used in sputtering may be placed much closer to the substrates since point sources are not involved.

The coating may be applied in a downward direction with the glass in a horizontal position. Vacuum evaporation can only coat in an upward direction with the glass either horizontal or vertical and this affects the uniformity of the coating.

Sputtering appears to be more reliable and maintenance free as a production system.

Sputtering allows more versatility as the materials may be easily changed from batch to batch. And a multiple-layer coating of several materials may be deposited during a single run simply by incorporating a sequence of targets in the system, such as the coating of the siliceous material or aluminum oxide protective layer over the metal coating.

SUMMARY OF THE INVENTION

The present invention provides a transparent article having reduced solar radiation transmittance and reduced glare, which comprises a body of transparent glassy siliceous material having a smooth continuous surface and a continuous film of nickel or nickel-base alloy sputter-coated on the continuous surface to a thickness of from 50 to 400 A. The transparent article may include a smooth continuous transparent layer of protective material overlaying said continuous film to protect said film from wear. The protective material may be a siliceous material such as silicon dioxide, silicon monoxide, or Pyrex glass, or it may be aluminum oxide. The overlaying protective layer preferably has a thickness of from 0.1 to 10 microns.

The method of preparing glass products according to the invention typically includes placing the transparent glassy siliceous body having a smooth continuous surface in a deposition chamber containing an inert gas maintained at a pressure of from 5 to 50 microns, bombarding the smooth continuous surface of the body with ions of the gas to clean the surface, sputter-coating on the surface to a thickness of from 50 to 400 A. a continuous film of nickel or a nickel-base alloy, and removing the body from the chamber. A continuous layer of protective material may be radio-frequency sputter-coated over the continuous film, preferably to a thickness of from 0.1 to 10 microns.

DESCRIPTION OF THE PREFERRED EMBODIMENT

The present invention is based upon our finding that sputter-coating of nickel and nickel-base alloy films onto a glass substrate will provide an article with improved transmittance characteristics. A typical article according to the invention comprises a body of transparent glassy siliceous material having a smooth continuous surface and a continuous film sputter-coated on the smooth surface to a thickness of from 50 to 400 A. The transparent bodies of primary concern are architectural glass, vehicle windows, and oven windows, although other uses are possible. The glassy siliceous material is preferably conventional silicate glass including window glass, plate glass, and float glass, although any of the conventional or special purpose glasses may be employed as long as they are transparent. The continuous film must have a thickness of from 50 to 400 A. Continuous films having a thickness less than 50 do not provide any significant reduction in solar radiation transmittance and those having a thickness greater than 400 A. will substantially impair the transmission of visible light.

The article may include a smooth continuous layer of transparent protective material overlaying the continuous film to protect the film from wear. The protective material is preferably a siliceous material such as silicon dioxide, including quartz, silicon monoxide, or any of the conventional or special purpose glasses such as Pyrex. The protective glass may be clear or it may be tinted to modify the color of the finished article. Any of the forms of aluminum oxide may also be used as the protective material. The protective layer is preferably from 0.1 to 10 microns in thickness. Layers less than 0.1 microns in thickness do not provide any significant protection for the film and those in excess of 10 microns are uneconomical and may involve problems where materials having coefficients of thermal expansion different from the substrate are employed.

We have found that sputter-coated films of nickel and the nickel-base alloys exhibit improved reduction in solar radiation and glare when compared with other materials and processes commercially in use. Referring to the Figure, the graph shows the transmittance spectrum curves for various coating materials deposited on ordinary window glass one-eighth inch thick. Curve 10 represents a commercial chromium coating and curve 12 represents a commercial nickel coating, both of which were deposited by vacuum evaporation techniques. The commercial nickel coating of curve 12 had a thickness of about 230 A. whereas the commercial chromium coating of curve 10 had a thickness of about 80 A. The different thicknesses were chosen so that the transmittance spectrum curves would lie in the same area of the graph for comparison of the shapes of the curves. It should be noted that the shape of the transmittance spectrum curve is the significant feature for our purposes because it is indicative of the overall performance of the article. The shape of the curve will remain essentially the same even though its position on the graph will change according to the thickness of the deposited film. In observing the shape of curves 12 and 10 for commercial nickel and chromium, it is apparent that the transmittance undesirably increases throughout the infra-red range (those wavelengths in excess of 0.75 microns). Most significant is the increase in the range from 0.75 to 1.5 microns as this is the range in which most of the solar heat radiation in the infra-red range is transmitted.

Still referring to the Figure, curve 14 is the transmittance spectrum curve for sputter-coated pure nickel and curve 16 represents a sputtered coating of Inconel 610, a nickel-base alloy. The sputtered nickel coating was deposited to a thickness of about 250 A. and the sputtered Inconel 610 coating was deposited to a thickness of about 220 A. By comparing curves 14 and 16 with curves 10 and 12 it can be seen that the sputtered nickel and Inconel 610 coatings of curves 14 and 16 actually reduce the radiation transmittance over the infra-red range and especially in the range from 0.75 to 1.5 microns, whereas the commercial coatings of curves 10 and 12 show increased transmittance over these ranges. The glass sheets that were sputter-coated with nickel and nickel-base alloys clearly exhibit lower transmittance in the infra-red range than in the visible light range and the transmittance also decreases with increasing wavelength. It is clear from this that a transparent article can be produced which will allow transmission of a predetermined amount of visible light and at the same time allow only a minimum amount of heat radiation to pass therethrough. Thus for any thickness of coating, optimal overall performance of the article is achieved.

We have found sputter-coated continuous films of nickel and nickel-base alloys to have improved uniformity, purity, and crystalline structure. In addition, they form a hard, adherent, and durable coating which is highly desirable. The most preferable nickel alloys are those of the Inconel series, especially Inconel 610. Inconel 610 has the following composition (all percentages are by weight percent): 15.5 percent chromium, 9 percent iron, 1 percent manganese, 1.6 percent silicon, 0.5 percent copper, 2 percent columbium and tantalum, 0.2 percent carbon, and the balance nickel.

The following nickel-base alloy compositions are also preferred for use in an article according to the present invention:

(1) an alloy composition comprising about 12 to 28 percent chromium, 5 to 20 percent iron, the balance being nickel;

(2) an alloy composition comprising about 12 to 28 percent chromium, 5 to 20 percent iron, up to one-half the balance being cobalt, and the remainder of the balance being nickel;

(3) an alloy composition comprising about 12 to 28 percent chromium, 5 to 20 percent iron, 0.1 to 8 percent silicon, 0.02 to 0.4 percent carbon, the balance being nickel;

(4) an alloy composition comprising about 12 to 28 percent chromium, 5 to 20 percent iron, 0.1 to 8 percent silicon, 0.02 to 0.4 percent carbon, up to 7 percent of one element selected from the group consisting of manganese, aluminum, copper, columbium, tantalum, titanium and molybdenum, the balance being nickel; and
(5) an alloy composition comprising about 12 to 28 percent chromium, 5 to 20 percent iron, 0.1 to 8 percent silicon, 0.02 to 0.4 percent carbon, up to 12 percent of at least two elements selected from the group consisting of manganese, aluminum, copper, columbium, tantalum, titanium, and molybdenum, the balance being nickel.

In preparing glass products according to this invention, the body of transparent glassy siliceous material is first cleaned by a conventional washing operation and then placed in a deposition chamber containing an inert gas. The gas in the chamber is preferably maintained at a pressure of from 5 to 50 microns. At pressures below 5 microns the rate of deposition during coating is insufficient for most purposes and there is increased danger of surface contamination. At pressures above 50 microns the efficiency of the process is significantly reduced. The glass body is preferably heated to a temperature of about 250° C. prior to processing.

The smooth continuous surface is usually ion bombarded within the chamber to finally clean and prepare the surface for receiving the coating. This is generally done by the off-sputtering or reverse sputtering technique which is commonly known. Typically, the sputter-cleaning time is about 20 minutes at a power density of 0.1 to 1.0-watt/$cm.^2$. With certain types of substrates and certain washing or cleaning processes (prior to insertion in the chamber), the sputter-cleaning step may be unnecessary.

The clean, smooth surface is then sputter-coated with a continuous film of the nickel or nickel-base alloy composition. The coating may be done either by diode or triode sputtering techniques and is continued until a uniform coating having a thickness of from 50 to 400 A. is deposited. Typical sputtering conditions are 5,000 volts potential on the target (coating material) and a resulting current density of 0.5 to 1.0 $ma./cm.^2$ for a time period of 0.2 to several minutes depending on the thickness of coating desired.

In those cases where it is desired to deposit the protective layer over the continuous film, the coated article is preferably left in the deposition chamber and the overlayer deposited immediately by the radio-frequency sputtering technique. In such case a radio-frequency power source is connected to a separate target of the siliceous coating material to deposit a durable coating that will withstand weather and wear and can be cleaned.

It will be understood, of course, that while the forms of the invention herein shown and described constitute preferred embodiments of the invention, it is not intended to illustrate all possible forms of the invention. It will also be understood that the words used are words of description rather than of limitation and that various changes may be made without departing from the spirit and scope of the invention herein disclosed.

We claim:
1. A transparent article having reduced solar radiation transmittance and reduced glare, which comprises:

(a) a transparent glass sheet for use as a window pane and the like having a smooth continuous surface; and
(b) a continuous sputter-coated film on said continuous glass sheet to a thickness of from 200 to 400 A. a A., said film being a metal selected from the group consisting of nickel and nickel-base alloys;
(c) said coated glass sheet having a substantially uniform transmittance over the range of 0.75 to 2.0 microns at a level relatively lower than the level of transmittance in the visible range and the transmittance also being substantially uniform in the visible range of 0.4 to 0.75 microns resulting in excellent color fidelity and natural visibility therethrough substantially free from distortion.

2. A method of preparing glass sheets for use as window panes and the like having reduced solar radiation transmittance and reduced glare, which comprises:
(a) placing a transparent sheet of glass having a smooth, flat continuous surface in a deposition chamber containing an inert gas, said gas being maintained at a pressure of from 20 to 50 microns;
(b) providing a cathode having a continuous flat surface of a coating material selected from the group consisting of nickel and nickel-base alloys positioned in spaced, parallel relation to the continuous flat surface of the glass sheet and being of at least the same width as said glass surface;
(c) sputter-coating on said continuous surface of the glass sheet to a thickness of from 200 to 400 A. a continuous film of said selected metal (under conditions of about 5,000 volts potential on the coating material and a resulting current density of 0.5 to 1.0 $ma./cm.^2$ for a period of 0.2 to several minutes to obtain a coating thickness of from 200 to 400 A.); and
(d) removing the coated glass sheet from said chamber,
(e) said coated glass sheet having a substantially uniform transmittance over the range of 0.75 to 2.0 microns at a level relatively lower than the level of transmittance in the visible range and the transmittance also being substantially uniform in the visible range of 0.4 to 0.75 microns resulting in excellent color fidelity and natural visibility therethrough substantially free from distortion.

References Cited
UNITED STATES PATENTS

| | | | |
|---|---|---|---|
| 3,414,503 | 12/1968 | Brichard | 204—192 |
| 3,126,295 | 3/1964 | Young | 117—124 C |
| 2,920,002 | 1/1960 | Auwarter | 117—33.3 |

OTHER REFERENCES

Nathanson: Optical Society of America, Journal, October 1939, vol. 29, pp. 417–422.

THOMAS M. TUFARIELLO, Primary Examiner

U.S. Cl. X.R.

117—124 C

UNITED STATES PATENT AND TRADEMARK OFFICE
CERTIFICATE OF CORRECTION

PATENT NO. : 3,826,728
DATED : July 30, 1974
INVENTOR(S) : Douglas L. Chambers, Donald C. Carmichael and Chong T. Wan It is certified that error appears in the above—identified patent and that said Letters Patent are hereby corrected as shown below:

Claim 2, lines 3 to 7 of paragraph (c), cancel "(under conditions of about 5,000 volts potential on the coating material and a resulting current density of 0.5 to 1.0 ma./cm.$^2$ for a period of 0.2 to several minutes to obtain a coating thickness of from 200 to 400 A.)"

Signed and Sealed this

First Day of April 1980

[SEAL]

Attest:

SIDNEY A. DIAMOND

Attesting Officer

Commissioner of Patents and Trademarks

REEXAMINATION CERTIFICATE (514th)

United States Patent [19]

Chambers et al.

[11] B1 3,826,728

[45] Certificate Issued    Jun. 10, 1986

[54] TRANSPARENT ARTICLE HAVING REDUCED SOLAR RADIATION TRANSMITTANCE AND METHOD OF MAKING THE SAME

[75] Inventors: Douglas L. Chambers; Donald C. Carmichael; Chong T. Wan, all of Columbus, Ohio

[73] Assignee: Shatterproof Glass Corporation, Detroit, Mich.

Reexamination Request:
No. 90/000,529, Mar. 19, 1984

Reexamination Certificate for:
Patent No.: 3,826,728
Issued: Jul. 30, 1974
Appl. No.: 253,278
Filed: May 15, 1972

Certificate of Correction issued Apr. 1, 1980.

Related U.S. Application Data

[63] Continuation of Ser. No. 38,962, May 20, 1970, abandoned.

[51] Int. Cl.$^4$ .............................................. C23C 15/00
[52] U.S. Cl. ........................... 204/192 P; 204/192 R; 204/192 C; 350/1.7; 427/35; 428/432; 428/433
[58] Field of Search .......... 427/35; 204/192 P, 192 C, 204/192 R; 350/1.7; 428/432, 433

[56] References Cited

U.S. PATENT DOCUMENTS

| Number | Date | Name | Class |
|---|---|---|---|
| Re. 27,473 | 9/1972 | Mauer | 350/2 |
| 1,176,313 | 3/1916 | Pfund | 350/2 |
| 1,957,279 | 5/1934 | Linke | 106/36.2 |
| 2,409,356 | 10/1946 | Hutchings | 88/54 |
| 2,430,520 | 11/1947 | Marboe | 117/35 |
| 2,478,817 | 8/1949 | Gaiser | 33/105 |
| 2,628,927 | 2/1953 | Colbert et al. | 154/2.73 |
| 2,676,117 | 4/1954 | Colbert | 204/192 SP |
| 2,761,945 | 9/1956 | Colbert et al. | 219/19 |
| 2,808,351 | 10/1957 | Colbert et al. | 117/211 |
| 2,825,687 | 3/1958 | Preston | 204/192 |
| 2,852,415 | 9/1958 | Colbert et al. | 117/211 |
| 2,914,428 | 11/1959 | Ruckelshaus, et al. | 117/217 |
| 2,993,806 | 7/1961 | Fisher | 117/71 |
| 2,996,418 | 8/1961 | Bleil | 154/95 |
| 3,010,850 | 11/1961 | Colbert et al. | 117/211 |
| 3,076,672 | 2/1963 | Harwig | 117/211 |
| 3,160,576 | 12/1964 | Eckert | 204/192 |
| 3,303,040 | 2/1967 | Brockman | 117/7 |
| 3,303,116 | 2/1967 | Maissel et al. | 204/192 |
| 3,303,117 | 2/1967 | Flur | 204/192 |
| 3,305,380 | 2/1967 | Adomines | 117/7 |
| 3,400,066 | 9/1968 | Caswell et al. | 204/192 |
| 3,410,710 | 11/1968 | Mochel | 117/33.3 |
| 3,411,934 | 11/1968 | Englehart et al. | 117/33.3 |
| 3,411,960 | 11/1968 | Flur | 148/31.55 |
| 3,433,721 | 3/1969 | Wolf | 204/38 |
| 3,475,309 | 10/1969 | Brook | 117/33.3 |
| 3,505,092 | 4/1970 | Ryan et al. | 117/33.3 |
| 3,527,891 | 8/1970 | Rairden, III | 117/215 |
| 3,530,055 | 9/1970 | Maissel et al. | 204/192 |
| 3,537,944 | 5/1970 | Grubb et al. | 161/4 |
| 3,601,471 | 8/1971 | Seddon | 350/166 |
| 3,679,291 | 7/1972 | Apfel et al. | 350/164 |
| 3,694,337 | 9/1972 | Kushihashi et al. | 204/192 |
| 3,781,089 | 12/1973 | Fay et al. | 350/164 |
| 3,798,146 | 3/1974 | Wan et al. | 204/192 |
| 3,846,152 | 11/1974 | Franz | 117/33.3 |
| 4,015,558 | 4/1977 | Small | 118/6 |

FOREIGN PATENT DOCUMENTS

| | | |
|---|---|---|
| 1058805 | 6/1959 | Fed. Rep. of Germany . |
| 1086018 | 7/1960 | Fed. Rep. of Germany . |
| 1087828 | 8/1965 | Fed. Rep. of Germany . |
| 1088198 | 9/1960 | Fed. Rep. of Germany . |
| 1117800 | 11/1961 | Fed. Rep. of Germany . |
| 1329988 | 7/1962 | France . |
| 1556227 | 9/1967 | France . |
| 1189714 | 4/1970 | United Kingdom . |

OTHER PUBLICATIONS

German Publication "Large–Area Coating of Glass for Modification of its Transmittance" by Hubert Schroder from Glastechnische Berichte, Mar., 1966.

Glass Magazine, Oct. 1951, "Metallizing Glass" by Elmer Umblia.

"The Choice of Deposition Technique for Ni–Fe–Cr Thin Films" by A. S. Young and R. J. Heritage (1968).

ECOM (Apr. 1965), "Comparison of Some Physical and Chemical Properties of Vacuum Evaporated and Sputtered Nickel–Chromium Films" by Pratt, Weintraub and Wade.

Handbook of Optics, 1978, pp. 8–40 to 8–41, Pratt et al., Technical Report ECOM2582.

Holland, "Vacuum Deposition of Thin Films", 1958, pp. 194–195.

Primary Examiner—Arthur P. Demers

[57] ABSTRACT

A transparent article having reduced solar radiation transmittance which comprises a body of transparent glassy siliceous material having a smooth continuous surface and a continuous film of nickel or nickel-base alloys sputter-coated on said continuous surface to a thickness of from 50 to 400 A. The article may include a continuous protective layer of a siliceous or aluminum oxide material overlying the continuous film. The sputter-coating technique permits the metal film to be deposited with greater uniformity and purity. The resulting article minimizes the transmittance of radiation in the infra-red range for any selected transmittance of visible light.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1 and 2 is confirmed.

New claims 3–16 are added and determined to be patentable.

*3. The article of claim 1 wherein the film is comprised of nickel.*

*4. The article of claim 1 wherein the film is comprised of a nickel-based alloy.*

*5. The article of claim 4 wherein the alloy also contains chromium and iron.*

*6. The method of claim 2 wherein the coating material is comprised of nickel.*

*7. The method of claim 2 wherein the coating material is comprised of a nickel-based alloy.*

*8. The method of claim 7 wherein the alloy also contains chromium and iron.*

*9. The article of claim 15 wherein the film is comprised of nickel.*

*10. The article of claim 15 wherein the film is comprised of a nickel-based alloy.*

*11. The article of claim 10 wherein the alloy also contains chromium and iron.*

*12. The method of claim 16 wherein the coating material is comprised of nickel.*

*13. The method of claim 16 wherein the coating material is comprised of nickel-based alloy.*

*14. The method of claim 13 wherein the alloy also contains chromium and iron.*

*15. A transparent article having reduced solar radiation transmittance and reduced glare, which comprises:*
  *(a) A transparent glass sheet for use as a window pane and the like having a smooth continuous surface; and*
  *(b) a continuous sputter-coated film on said continuous glass sheet to a thickness of from 200 to 400 A., said film being a metal selected from the group consisting of nickel and nickel-base alloys;*
  *(c) said coated glass sheet having a substantially uniform transmittance over the range of 0.75 to 2.0 microns at a level relatively lower than the level of transmittance in the visible range and the transmittance also being substantially uniform in the visible range of 0.4 to 0.75 microns resulting in excellent color fidelity and natural visibility therethrough substantially free from distortion; and,*
  *(d) further comprising a smooth continuous transparent sputtered layer of protective material overlying the continuous film.*

*16. A method of preparing glass sheets for use as window panes and the like having reduced solar radiation transmittance and reduced glare, which comprises:*
  *(a) placing a transparent sheet of glass having a smooth, flat continuous surface in a deposition chamber containing an inert gas, said gas being maintained at a pressure of from 20 to 50 microns;*
  *(b) providing a cathode having a continuous flat surface of a coating material selected from the group consisting of nickel and nickel-base alloys positioned in spaced, parallel relation to the continuous flat surface of the glass sheet and being of at least the same width as said glass surface;*
  *(c) sputter-coating on said continuous surface of the glass sheet to a thickness of from 200 to 400 A. a continuous film of said selected metal;*
  *(d) sputter-coating a smooth, continuous transparent layer of protective material over the continuous film and;*
  *(e) removing the coated glass sheet from said chamber;*
  *(f) said coated glass sheet having a substantially uniform transmittance over the range of 0.75 to 2.0 microns at a level relatively lower than the level of transmittance in the visible range and the transmittance also being substantially uniform in the visible range of 0.4 to 0.75 microns resulting in excellent color fidelity and natural visibility therethrough substantially free from distortion.*

* * * * *

REEXAMINATION CERTIFICATE (1841st)
United States Patent [19]
Chambers et al.

[11] B1 3,826,728
[45] Certificate Issued  Nov. 10, 1992

[54] TRANSPARENT ARTICLE HAVING REDUCED SOLAR RADIATION TRANSMITTANCE AND METHOD OF MAKING THE SAME

[75] Inventors: Douglas L. Chambers; Donald C. Carmichael; Chong T. Wan, all of Columbus, Ohio

[73] Assignee: The BOC Group PLC, Windlesham, England

Reexamination Request:
No. 90/001,773, May 17, 1989
No. 90/001,848, Sep. 25, 1989
No. 90/001,858, Oct. 5, 1989
No. 90/002,091, Jul. 20, 1990

Reexamination Certificate for:
Patent No.: 3,826,728
Issued: Jul. 30, 1974
Appl. No.: 253,278
Filed: May 15, 1972

Certificate of Correction issued Apr. 1, 1980.

[51] Int. Cl.$^5$ ............................................. C23C 14/34
[52] U.S. Cl. ........................... 204/192.1; 204/192.15; 204/192.16; 359/360; 427/35; 428/433; 428/482
[58] Field of Search ...................... 204/192.27, 192.15, 204/192.16; 359/360; 427/35; 428/433, 482

[56] References Cited

U.S. PATENT DOCUMENTS

2,886,502  5/1959  Holland.
3,076,727  12/1959  Harwig.
3,414,503  3/1965  Brichard.
3,476,594  4/1966  Soderberg.
3,501,393  5/1967  Wehner et al..
3,673,006  9/1968  Plumat et al..

OTHER PUBLICATIONS

Technical Report ECOM-2582 published Apr. 1965, written by I. H. Pratt, W. Weintraub and W. Wade, entitled "Comparison of Some Physical and Chemical Properties of Vacuum Evaporated and Sputtered Nickel-Chromium Films".

(List continued on next page.)

*Primary Examiner*—T. M. Tufariello

[57] ABSTRACT

A transparent article having reduced solar radiation transmittance which comprises a body of transparent glassy siliceous material having a smooth continuous surface and a continuous film of nickel or nickel-base alloys sputter-coated on said continuous surface to a thickness of from 50 to 400 A. The article may include a continuous protective layer of a siliceous or aluminum oxide material overlying the continuous film. The sputter-coating technique permits the metal film to be deposited with greater uniformity and purity. The resulting article minimizes the transmittance of radiation in the infra-red range for any selected transmittance of visible light.

OTHER PUBLICATIONS

The complete German article by Hubert Schroder entitled "Layer Area Coating of Glass for Modification of Its Transmittance" Glastechnik Berichte, vol. 39, No. 3 (Mar. 1966) pp. 156–163, (hereafter Schroder II). Only pp. 156–158 of this article are of record in the pending Reexamination and are identified by Requester as Schroder. The complete article is submitted to show additional material parts of the article.

Scanglas Svenska, A.B. brochure, published 1969.

Kodak neutral density attenuators having an alleged publication date in 1967. These documents pursuant to the Affidavit of Jerzy Adam Dobrowolski were the source documents for the Handbook of Optics, published in 1978, pp. 8-40 to 8-41.

Glas-Keramik—TEGL #4, 10/68.

Byggnadstidningen No. 20, 1967, entitled: "Technical & Economic Aspects of Sun Protecting Glass" by Rune Pensson.

A Swedish paper by Rune Persson, Sc.D., published in 1966 by The Swedish Society of Heating, Ventilating and Sanitation Engineers, entitled "Varmeabsorberande Och Varmereflekterande Glas" (hereafter Persson I).

Solarpane: Ljus-Och Varmere flekterande Isolerrator ("Solarpane Light-and Heat-reflecting insulating Window Glass")-product brochure, 1965 of Grangesberg Corporation.

Pages 61-63 and 72-108 from the chapter by L. I. Maissel, entitled "The Deposition of Thin Films by Cathode Sputtering", of the book *Physics of Thin Films*, vol. 3, published in 1966 (hereinafter Maissel).

A German paper by Rune Persson, Sc.D., published in 1968 in VDI—Zeitschrift Bd. 110 Nr. 1, S. 9/15, entitled "Warmeabsorbierende und warmereflektierende Glaser" (hereinafter Persson II).

A report by J. Lelong and L. Leger presented at au Colloque Vitroger-Miroiterie Charleroi, Belgium, Dec. 1968), entitled "Possibilitis actuelles d'application des depots de couches minces sous vide a la miroiterie" (hereinafter Lelong).

Pages 436–439 from Chap. 16, and Plate 21, of the book by L. Holland, entitled "Vacuum Deposition of Thin Films", published in 1961 (hereinafter Holland II)[1].

A paper by W. L. Patterson and G. A. Shirn, entitled "The Sputtering of Nickel-Chromium Alloys", published in 1967 in the *Journal of Vacuum Science and Technology*, vol. 4, pp. 343 to 346 (hereinafter Patterson).

Pages 86 and 87 of the book entitled *Thin–Film Optical Filters* by H. A. Macleod, published in 1969 (hereinafter Macleod).

Paper by P. D. Davidse and L. I. Maissel, entitled "Dielectric Thin Films through rf Sputtering", published in 1966 in the *Journal of Applied Physics*, vol. 37, pp. 574 to 579 (hereinafter Davidse).

A paper by M. H. Francombe and A. J. Noreika, entitled "Some Properties of Uniaxial Permalloy Films Prepared by Cathodic Sputtering" published in 1961 in the *Journal of Applied Physics*, Supplement to vol. 32, No. 3, pp. 97S and 98S (hereafter Francombe).

A paper by R. H. Alderson and F. Ashworth, entitled "Vacuum-Deposited Films of Nickel-Chromium Alloy", published in the *British Journal of Applied Physics*, vol. 8, May 1957, pp. 205-210.

A paper by Eric Kay, entitled "Magnetic Thin films Prepared by Sputtering" published in Mar. 1961 in *Journal of Applied Physics*, Supplement to vol. 32, pp. 99S-101S.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-16 is confirmed.

* * * * *

REEXAMINATION CERTIFICATE (2332nd)
United States Patent [19]
Chambers et al.

[11] B3 3,826,728
[45] Certificate Issued Jul. 12, 1994

[54] TRANSPARENT ARTICLE HAVING REDUCED SOLAR RADIATION TRANSMITTANCE AND METHOD OF MAKING SAME

[75] Inventors: Douglas L. Chambers; Donald C. Carmichael; Chong T. Wan, all of Columbus, Ohio

[73] Assignee: The BOC Group Plc., Windlesham Surrey, England

Reexamination Request:
No. 90/002,836, Sep. 15, 1992

Reexamination Certificate for:
Patent No.: 3,826,728
Issued: Jul. 30, 1974
Appl. No.: 253,278
Filed: May 15, 1972

Certificate of Correction issued Apr. 1, 1980.

Related U.S. Application Data

[63] Continuation of Ser. No. 38,962, May 20, 1970, abandoned.

[51] Int. Cl.⁵ .............................................. C23C 14/34
[52] U.S. Cl. ......................... 204/192.27; 204/192.15; 204/192.16; 359/360; 428/433; 428/482
[58] Field of Search ...................... 204/192.15, 192.16, 204/192.27; 359/360; 428/433, 482

[56] References Cited

U.S. PATENT DOCUMENTS

| | | | |
|---|---|---|---|
| 2,886,502 | 5/1959 | Holland | 204/192.12 |
| 3,076,727 | 12/1959 | Harwig | 428/432 |
| 3,414,503 | 3/1965 | Brichard | 204/298.29 |
| 3,476,594 | 4/1966 | Soderberg | 427/108 |
| 3,501,393 | 5/1967 | Wehner et al. | 204/298.12 |
| 3,673,006 | 9/1968 | Plumat et al. | 427/567 |

FOREIGN PATENT DOCUMENTS

682,264 11/1952 United Kingdom

OTHER PUBLICATIONS

Kodak Neutral Density Attenuators, July 1, 1967
Handbook of Optics, 1978, pp. 8-40 to 8-41
"Glastechnische Berichte", Vol. 39, No. 3 (March 1966) pp. 156-158, article by Hubert Schroder entitled "Layer Area Coating of Glass for Modification of Its Transmittance"
Technical Report ECOM-2582 published April 1965, written by I. H. Pratt, W. Weintraub and W. Wade, entitled "Comparison of Some Physical and Chemical Properties of Vacuum Evaporated and Sputtered Nickel-Chromium Films".
Scanglas Svenska, A.B. brochure published 1969.
A Swedish paper by Rune Persson, Sc.D., published in 1966 by The Swedish Society of Heating, Ventilating and Sanitation Engineers, entitled "Varmeabsorberande Och Varmereflekterande Glas"
A German paper by Rune Persson, Sc.D., published in 1968 in VDI-Zeitschrift Bd. 110 Nr. 1, S. 9/15, entitled "Warmeabsorbierende und warmereflektierende Glaser"
A report by J. Lelong and L. Leger presented at au Colloque Vitroger-Miroiterie (Charleroi, Belgium, December 1968), entitled "Possibilitis actuelles d'application des depots de couches minces sous vide a la miroiterie"
Pages 436-439 from Chapter 16, and Plate 21, of the book by L. Holland, entitled "Vacuum Deposition of Thin Films", published in 1961
Pages 61-63 and 72-108 from the chapter by L.I. Maissel, entitled "The Deposition of Thin Films by Cathode Sputtering", of the book Physics of Thin Films, Volume 3, published in 1966
A paper by W.L. Patterson and G.A. Shirn, entitled "The Sputtering of Nickel-Chromium Alloys", published in 1967 in the Journal of Vacuum Science and Technology, Volume 4, pages 343 to 346
Pages 86 and 87 of the book entitled Thin-Film Optical Filters by H.A. Macleod, published in 1989
Paper by P.D. Davidse and L.I. Maissel, entitled "Dielectric Thin Films through rf Sputtering", published in 1966 in the Journal of Applied Physics, Volume 37, pages 574 to 579
A paper by M.H. Francombe and A.J. Noreika, entitled "Some Properties of Uniaxial Permalloy Films Prepared by Cathodic Sputtering" published in 1961 in the Journal of Applied Physics, Supplement to Vol. 32, No. 3, pages 97S and 98S
The complete German article by Huber Schroder entitled "Layer Area Coating of Glass for Modification of Its Transmittance" Glastechnik Berichte, Vol. 39, No. 3 (March 1966) pages 156-163,
A paper by R.H. Alderson and F. Ashworth, entitled "Vacuum-Deposited Films of Nickel-Chromium Alloy", published in the British Journal of Applied Physics, Vol. 8, May 1957, pages 205-210.
A paper by Eric Kay, entitled "Magnetic Thin Films Prepared by Sputtering" published in March 1961 in Journal of Applied Physics, Supplement to Vol. 32, pages 99S-101S.
Aricle by R.B. Belser and W.H. Hicklin, entitled "Simple, Rapid Sputtering Apparatus", published in May 1956, in The Review Of Scientific Instruments, Vol. 27, No. 5, pages 293-296
Article by S. Bateson, entitled "Aluminum Reflecting Films Applied To Glass And Plastics", published in October 1952, in Vacuum, Vol. II, No. 4, pages 365-376

*Primary Examiner*—John F. Niebling

[57] ABSTRACT

A transparent article having reduced solar radiation transmittance which comprises a body of transparent glassy siliceous material having a smooth continuous surface and a continuous film of nickel or nickel-base allows sputter-coated on said continuous surface to a thickness of from 50 to 400 A. The article may include a continuous protective layer of a siliceous or aluminum oxide material overlying the continuous film. The sputter-coating technique permits the metal film to be deposited with greater uniformity and purity. The resulting article minimizes the transmittance of radiation in the infra-red range for any selected transmittance of visible light.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-6 is confirmed.

* * * * *